United States Patent [19]

Heel et al.

[11] Patent Number: 4,726,721

[45] Date of Patent: Feb. 23, 1988

[54] TOOL COUPLING

[75] Inventors: Helmut Heel, Lengenwang; Wolfgang Effenberger, Kempten, both of Fed. Rep. of Germany

[73] Assignee: A. Ott GmbH, Fed. Rep. of Germany

[21] Appl. No.: 917,402

[22] Filed: Oct. 10, 1986

[30] Foreign Application Priority Data

Nov. 21, 1985 [DE] Fed. Rep. of Germany ....... 3541236

[51] Int. Cl.$^4$ ................................................ B23C 5/26
[52] U.S. Cl. ................... 409/233; 279/1 TS; 408/239 R
[58] Field of Search ............... 409/232, 233, 234; 279/1 C, 1 TS, 103; 408/239 R, 239 A, 240

[56] References Cited

U.S. PATENT DOCUMENTS

| 2,359,286 | 10/1944 | Billger | 409/234 X |
| 3,554,080 | 1/1971 | Herrmann | 409/234 |
| 3,795,455 | 3/1974 | Kosmowski | 409/232 X |
| 4,229,130 | 10/1980 | Franklin | 409/234 |

FOREIGN PATENT DOCUMENTS

| 0088646 | 9/1983 | European Pat. Off. | 409/233 |
| 3314591 | 10/1984 | Fed. Rep. of Germany | |
| 6505456 | 11/1965 | Netherlands | 409/234 |
| 0403514 | 3/1974 | U.S.S.R. | 279/1 TS |

OTHER PUBLICATIONS

German Standard DIN 2080, Steilkegelschäfte fur Werkzeuge und Spannzeuge Form A, pp. 1, 2 and 3.
Verein Deutscher Ingenieure (Society of German Engineers), VDI 2814—Werkzeugschäfte fur automatischen Werkzeugwechsel—pp. 1, 2, & 3.

Primary Examiner—Z. R. Bilinsky
Attorney, Agent, or Firm—Toren, McGeady & Associates

[57] ABSTRACT

For the attachment of a tool provided with a cylindrical or frusto-conical shank to a rotating machine spindle at one end of the machine spindle a complementary reception opening for the shank is provided. The shank contains a coaxial bore and a plurality of slots distributed in the circumferential direction and extending through radially to the bore, which divide the shank within the reception opening into segments. In the region of the slots the shank widens out under the influence of centrifugal forces more than does the region of the spindle surrounding the shank. Thus the radial guidance of the tool is not lost even at very high rotation rates of 10,000 r.p.m. and above. A support shoulder on an annular collar of the tool prevents axial reshifting of the shank by reason of the axial stress of a clamping device and improves the rigidity of the tool-spindle connection. The bore extends through the annular collar. The external diameter of the annular collar is preferably made larger than according to standard. The end face of the spindle, intended to abut on the support shoulder, is radially inwardly provided with an annular recess and supports the tool on a maximum possible diameter. In addition a shape-engaging coupling can be provided between tool and spindle.

15 Claims, 4 Drawing Figures

TOOL COUPLING

BACKGROUND OF THE INVENTION

The invention relates to a tool coupling for the attachment of a tool to a rotating machine spindle.

A tool coupling for the attachment of a tool to a rotating machine spindle is known from DE-A-3,314,591. The tool comprises a frusto-conical centering journal which engages in a taper socket fast with the spindle. The end of the centering journal of larger diameter merges into a tool support shoulder extending at right angles to the axis of rotation and abutting, when the tool is coupled, on an abutment face which forms the end face of the taper socket. For torque transmission a coupling engaging by shape is provided. The angle of conicity of the centering journal is made slightly smaller than the angle of conicity of the taper socket and the centering journal is dimensioned so that it comes to abut in the taper socket firstly in the region of its smaller end and in tightening is driven with radial deformation into the taper socket, until the support shoulder rests against the abutment face.

In this, as also in other known tool couplings the spindle reception opening which receives the cylindrical or frusto-conical shank widens out appreciably, by reason of centrifugal forces when the machine spindle is driven at very high rotation rate for example of 20,000 r.p.m. or more. This has the consequence that the tool shank is no longer radially clamped in uniformly over its entire length, and radial play occurs.

The invention is directed towards provision of a tool coupling which guides the tool both axially and radially even at very high rotation rates, and requires comparatively small tool-changing forces.

SUMMARY OF THE INVENTION

In accordance with the invention the tool is provided with a shank which contains, in distribution over the shank circumference, several axially elongated slots extending through radially to a bore coaxially provided in the shank. The slots divide the shank into several segments distributed in the circumferential direction which widen the shank out radially by reason of centrifugal forces, namely to a greater extent than the radial widening of a shank reception opening of the machine spindle caused by centrifugal forces. The tool comprises a support shoulder for abutment to an end face of the spindle. Irrespective of the size of the radial widening of the shank, the support shoulder of the tool lies against the end face of the spindle and prevents subsequent axial movement by reason of the machining forces and the clamping forces of a clamping device which holds the tool axially braced on the spindle.

A coupling engaging by virtue of shape is expediently additionally provided between the tool and the machine spindle. The shape-engaging coupling ensures sufficiently great torque transmission even at low rotation rates at which the frictional engagement generated by centrifugal forces between the tool shank and the spindle, taken in itself, is inadequate. In this configuration the draw-in forces supplied by the clamping device serve only for the reaching of flat abutment of the support shoulder on the abutment face of the spindle and to guarantee the stability of the clamping engagement.

In embodiments with steep-taper shank the shank expediently is over-dimensioned in the axial region of the slots, in relation to the reception opening of the machine spindle. The over-dimensioning is comparatively small so that it can be brought back by elastic deformation of the slotted shank region, even by slight draw-in forces. The over-dimensioning can for example be so dimensioned that when the slotted region rests flat on the reception opening of the machine spindle a gap of 0.01 to 0.02 mm. remains between the support face of the tool and the abutment face of the machine spindle. The gap is then taken up, in the drawing-in of the tool, by draw-in forces of only a few Newtons. In order to ensure a defined abutment in the slot region of the shank, the shank regions placed axially outside the slot region expediently are under-dimensioned in relation to the reception opening of the machine spindle. The slot preferably reaches only as far as the support surface of the tool, so that the slotted shank region lies completely within the reception opening and damage to the shank due to widening is avoided. The bore in the shank extends axially on both sides beyond the slot region and especially also beyond the end face of the spindle into the shank region lying outside the spindle.

The effect whereby the slotted shank region widens in dependence upon the rotation rate more than does the region of the spindle surrounding the shank is also supported by the fact that the support shoulder of the tool is provided on an annular collar the diameter of which is made larger than the diameter laid down for conventional tool shanks according to the German standards DIN 2080 or VDI 2814. In the case of steep-taper shanks with trapezium-shaped channel it has proved favorable if the collar diameter is made approximately equal to the next larger standardized collar diameter in each case.

In a further expedient development of the invention, which can also be used in tool couplings for exclusively slowly rotating machine spindles, slotted tool shanks can be utilized to eliminate radial play if a widening cone tapering towards the free end of the shank and couplable with the clamping device is axially displaceably arranged in the coaxial bore of the tool shank, upon which cone the shank is radially supported in the region of the slots. In the clamping of the tool the clamping device, which displaces the widening cone axially in relation to the shank, widens the shank radially out and eliminates radial play even when the tool is rotating slowly or is stationary. The coaxial bore of the shank can be made conical in the region of the slots. Alternatively, for example in the case of a cylindrical bore, a radially widenable pressure-transmission body can be used. The pressure-transmission body is expediently a bush which is made in serpentine form in cross-section by axial grooves alternating in the circumferential direction.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE DRAWINGS

Figure 1:
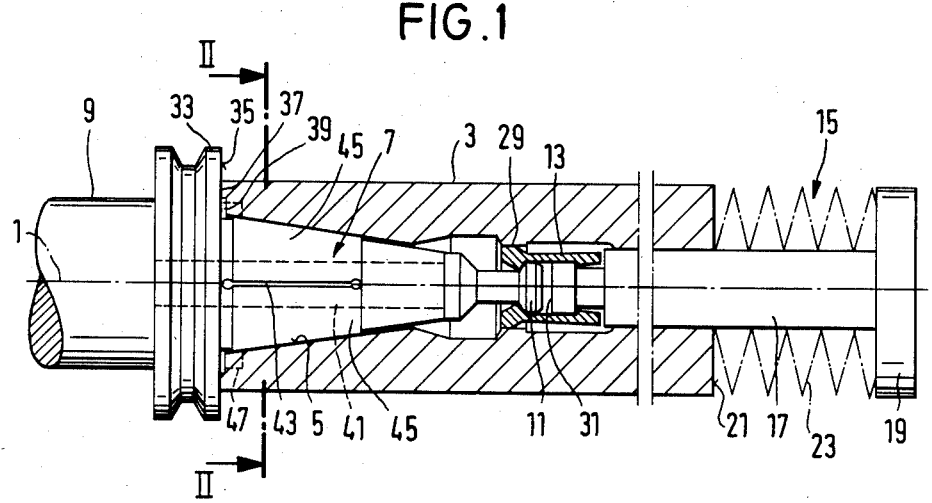
FIG. 1 shows a diagrammatic tool coupling for tools with steep-taper shank, represented partially in axial longitudinal section.
Figure 2:
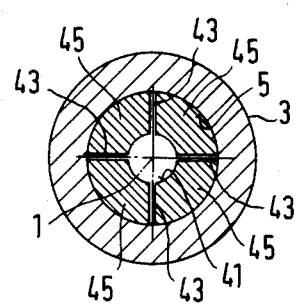
FIG. 2 shows a cross-section through the tool coupling, seen along a line II—II in FIG. 1.

FIGS. 1 and 2 show a machine tool spindle 3 rotating about a rotation axis 1 with very high rotation rate of at least 10,000 r.p.m., for example of a milling machine. The tool end of the spindle 3 comprises a taper socket 5 for a frusto-conical shank 7 of a steep-taper tool 9 or of a tool holder with steep-taper shank. At its narrowed end the shank 7 carries a head 11 on which a collet 13 of a clamping device designated generally by 15 acts to draw the shank 7 into the taper socket 5 and/or hold it there. The clamping device 15 comprises a draw rod 17 coaxially displaceable in the spindle 3, connected at its tool end with the collet and carrying an abutment head 19 at its other end. Between the abutment head 19 and a shoulder 21 of the spindle 3 pointing axially away from the tool end a spring 23 is stressed which generates the axial draw-in and retaining forces exerted by the collet 13 upon the shank 7. The collet 13 is opened and closed by means of cams 29 fast with the spindle 3, in dependence upon the displacement of the draw rod 17. FIG. 1 shows the collet 13 in the clamping position. By displacement of the draw rod 17 against the force of the spring 23 towards the taper socket 5 the collet 13 is opened and the tool 9 is ejected from the taper socket 5 by means of a stop 31 abutting on the head 11. A hydraulic cylinder (not further illustrated) can be provided for the actuation of the draw rod 17 in the ejection direction.

In the region of the end of the shank 7 of larger diameter the tool is provided with an annular collar 33 which has a flat support shoulder 35 extending towards the shank 7 at right angles to the axis 1 of rotation. The support shoulder 35 lies, in the clamping position, against a flat end face 37, likewise extending perpendicularly of the axis 1 of rotation, of the spindle 3. The end face 37 merges by way of an annular axial recess 39 into the taper socket 5, so that its internal diameter extends at a radial distance from the maximum diameter of the taper socket 5. The recess 39 ensures that the support shoulder 35 of the tool 9 is axially supported on the spindle 3 on the largest possible diameter, which is to the benefit of the stability and rigidity of the tool coupling.

The frusto-conical part of the shank 7 contains a bore 41 coaxial with the rotation axis and extending beyond the region of the taper socket 5 into the annular collar 33. Several slots 43, here four, arranged at equal angular intervals around the axis 1 of rotation divide the shank 7 within the taper socket 5 into several, here four, axially elongated segments 45. The segments 45 are so dimensioned, by suitable selection of the diameter of the bore 41 and of the number and length of the slots 43, that the diameter of the shank 7 in the region of the slots 43 widens out by reason of centrifugal forces more rapidly than does the part of the taper socket 5 surrounding the slot region. In this way loss of the radial guidance of the tool 9 at high rotation rates by reason of the widening of the spindle 3 caused by centrifugal force is prevented.

The slots 43 extend in axial sectional planes which at the same time contain the axis 1 of rotation, beginning very close to the support shoulder 35 and ending at a distance from the end of the shank 7 of smaller diameter. The region of the shank 7 placed axially between the end of the shank 7 of smaller diameter and the slots is under-dimensioned in relation to the taper socket 5 and the clamping position of the shank. On the other hand in the region of the slots 43 the shank is over-dimensioned in relation to the taper socket 5, so that in the clamping position the shank 7 is guided substantially only by the segments 45 in the taper socket 5. In a similar manner the transition of the shank 7 to the support shoulder 35 is formed with under-dimensioning. The over-dimensioning of the segments 45 is so dimensioned that the segments 45, in the drawing of the shank 7 into the taper socket, already come to abutment on the taper socket when the support shoulder 35 still extends at a short distance, for example of 0.01 to 0.02 mm., from the end face 37. The segments 45 are radially elastically deformed in drawing-in, but slight draw-in forces for example of a few Newtons suffice for complete drawing-in.

The annular collar 33 has a larger external diameter, compared with conventional steep-taper tools. In combination with the bore 41, which also penetrates the annular collar 33, this ensures that the shank 7 widens out in the transition region outside the taper socket 5 too, under the action of centrifugal forces, more than does the end face region of the taper socket 5. In the case of an annular collar with trapezium-shaped groove it has proved expedient if the external diameter of the annular collar is selected in each case according to the next larger standardized diameter according to the German standard DIN 2080 or VDI 2814, as stated as example in the following table.

| SK | 30 | 40 | 45 |
| --- | --- | --- | --- |
| d₁ mm. | 31.75 | 44.45 | 57.15 |
| d₂ mm. | 60 | 77 | 97 |

In the table SK signifies the standard size, $d_1$ the largest cone diameter of the shank 7 and $d_2$ the external diameter of the annular collar 33.

The frictional engagement produced by the segments 45 suffices at high rotation rates for the secure transmission of the torque. In order to transmit a sufficiently high torque even at low rotation rates, in the region of the support shoulder 35 and of the end face 37 a coupling engaging by virtue of shape is provided, for example a dog coupling entered in chain lines at 47.

The tool coupling as explained above permits, from low up to very high rotation rates, the transmission of a great torque with improved rigidity and stability of the tool. Since the support shoulder 35 prevents axial re-shifting of the tool on a widening of the taper socket 5, not only the draw-in forces but also the ejection forces to be applied in tool changing are slight.

Figure 3:
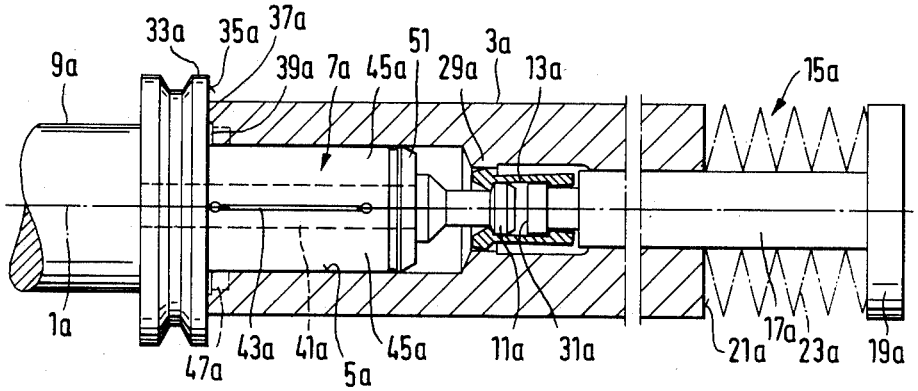
FIG. 3 shows a diagrammatic tool coupling for tools with cylindrical shank, represented partially in axial longitudinal section.

FIG. 3 shows a variant of the tool coupling for tools with cylindrical shanks. The tool coupling differs essentially only in the form of the shank and of the associated reception bore of the spindle from the tool coupling according to FIGS. 1 and 2, so that for explanation reference is made to the description of FIGS. 1 and 2, using like references for like parts, increased by the distinguishing letter a.

The cylindrical shank 7a is seated in a cylindrical reception opening 5a of the spindle 3a and contains a bore 41a which extends beyond the end face 37a of the spindle 3a into an annular collar 33a. The end face 37a is radially separated from the reception opening 5a by an annular recess 39a so that the support shoulder 35a of the annular collar 33a is supported on the spindle 3a substantially only in the region of the external diameter of the latter. The slots 43a extend from the support shoulder 35a axially to the free end of the shank 7a, and end at a distance from the end. A guide-in slope at the end of the shank 7a facilitates introduction into the reception opening 5a. Due to the division of the shank 7a into segments 45a and the boredthrough configuration of the annular collar 33a it is ensured that by reason of centrifugal forces the shank always widens out more than does the region of the spindle 3a surrounding the shank. The diameter of the annular collar 33a is again larger than corresponds to the standard, in the case of a configuration with trapezium-shaped groove it is selected for example in accordance with the next-larger standard diameter in each case.

Figure 4:
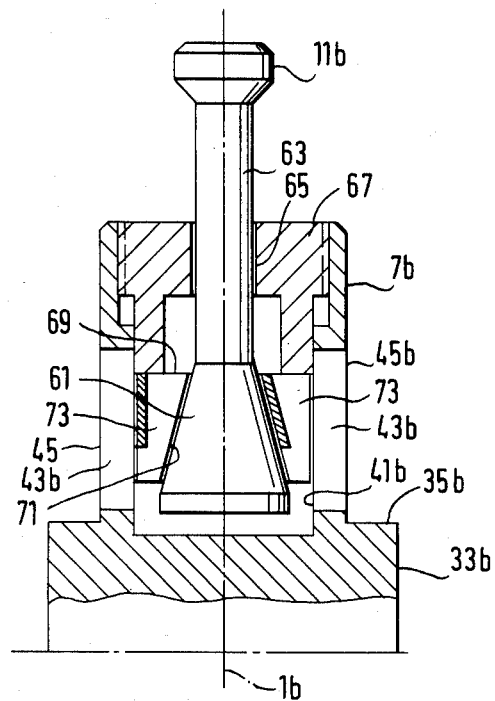
FIG. 4 shows a partial diagrammatic axial longitudinal section through a variant of a tool.

FIG. 4 shows by the example of a tool with cylindrical shank a variant which is also usable for tool couplings of tools with conical shanks, especially also with short-taper shank. The variant achieves the object that radial play is taken up even when the tool spindle (not further illustrated) is stationary or in slow rotation. For the explanation of the tool, its shank and its draw-in elements reference is made to the description of FIGS. 1 and 2, like references increased by the letter b being used for parts of like effect.

An expander cone 61 is arranged in the bore 41b of the tool shank 7b, which bore is coaxial with the axis 1b of rotation of the tool, in the region of the axially extending slots 43b which penetrate the shank 7b. The expander cone 61 tapers towards the free end of the shank 7b and carries at its tapered end a guide journal 63 which guides the expander cone 61 in a central bore 65 of a nut 67 screwed into the bore 41b. The journal 63 carries, at its cone-remote end placed outside the bore 41b, the head 11b provided for the coupling with the collet of the clamping device. In the bore 41b there is further seated, axially supported on the nut 67, a bush 69 which is supported with its external circumference in the region of the slots 43b on the internal circumference of the shank 7b. The bush lies with an internal taper 71 matching the expander cone 61 upon the expander cone 61. Axial grooves 73 in plural arrangement engage radially in the bush 69 alternately from the external circumference and the internal circumference. Thus the bush 69 has a somewhat serpentine cross-section, so that it can be widened out radially by means of the expander cone 61. In the clamping of the tool the expander cone 61 converts the clamping force exerted by the clamping device upon the head 11b into a radial force acting through the bush upon the segments 45b placed between the slots 43b, and widens out the shank 7b in the region of the slots even when the tool is stationary or rotating only at slow rotation rate. Thus radial play of the tool coupling can be compensated independently of the centrifugal force behavior of the segments 45b.

While specific embodiments of the invention have been shown and described in detail to illustrate the application of the inventive principles, it will be understood that the invention may be embodied otherwise without departing from such principles.

What we claim is:

1. A tool coupling for the attachment of a tool to a machine spindle adapted to rotate about its spindle axis, comprising:

first coupling means having an axially extending shank with a free end and containing a coaxial bore and, in distribution over the circumference of the shank, a plurality of axially elongated slots extending through radially to the bore, second coupling means having a shank reception opening at one end of said spindle complementary to said shank, and axially braceable clamping means acting disengageably on said free end of the shank, said first coupling means being provided with a support shoulder and said second coupling means being provided with an abutment end face extending at right angles to the spindle axis for abutment of the support shoulder and for limiting the depth of penetration of the shank into said reception opening.

2. A tool coupling according to claim 1 wherein the slots extend only over a part of the axial length of the shank.

3. A tool coupling according to claim 1, wherein the slots reach axially substantially as far as the support shoulder 4. A tool coupling according to claim 1, wherein the slots are arranged in axial longitudinal sectional planes containing the spindle axis.

5. A tool coupling according to claim 1, wherein at least three slots are provided at equal angular distances from one another.

6. A tool coupling according to claim 1, wherein the support shoulder is provided on a radially protruding collar and the bore extends axially through the collar.

7. A tool coupling according to claim 6, wherein the diameter of the collar is made equal to the diameter for the next larger shank size in each case.

8. A tool coupling according to claim 1, wherein said shank is a frusto-conical shank having a narrowed end and being over-dimensioned in relation to the reception opening in the axial region of the slots.

9. A tool coupling according to claim 8, wherein the shank is under-dimensioned, in relation to the reception opening, at least in its region axially adjoining the slots towards the narrowed end.

10. A tool coupling according to claim 1, wherein the internal circumference of said end abutment face extends with radial spacing from the circumference of the reception opening.

11. A tool coupling according to claim 1, wherein said first and second coupling means are provided with a shape-engaging coupling for torque transmission in the region of said support shoulder and said abutment face.

12. A tool coupling according to claim 1, wherein an expander cone tapering to the free end of the shank and couplable with said clamping means is axially displaceably arranged in the coaxial bore of the shank and wherein the shank is radially supported on the expander cone in the region of the slots.

13. A tool coupling according to claim 12, wherein a pressure transmission body segmented in the circumferential direction by axial grooves or slots end enclosing the expander cone is arranged in the coaxial bore.

14. A tool coupling according to claim 13, wherein the pressure transmission body is formed as an internal-taper bush.

15. A tool coupling according to claim 14, wherein the grooves engage in the bush in each case by more than half the radial wall thickness of the bush in alternation in the circumferential direction from radially outwards and radially inwards.

* * * * *